US010805436B2

(12) United States Patent
Chalmers

(10) Patent No.: US 10,805,436 B2
(45) Date of Patent: Oct. 13, 2020

(54) DELIVER AN INGRESS PACKET TO A QUEUE AT A GATEWAY DEVICE

(71) Applicant: Hewlett Packard Enterprise Development LP, Houston, TX (US)

(72) Inventor: F. Steven Chalmers, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/321,377

(22) PCT Filed: Jul. 29, 2016

(86) PCT No.: PCT/US2016/044664
§ 371 (c)(1),
(2) Date: Jan. 28, 2019

(87) PCT Pub. No.: WO2018/022083
PCT Pub. Date: Feb. 1, 2018

(65) Prior Publication Data
US 2019/0173981 A1 Jun. 6, 2019

(51) Int. Cl.
*H04L 29/06* (2006.01)
*G06F 21/60* (2013.01)
*H04L 12/715* (2013.01)
*H04L 12/931* (2013.01)
*H04L 29/08* (2006.01)

(52) U.S. Cl.
CPC ............ *H04L 69/22* (2013.01); *G06F 21/606* (2013.01); *H04L 45/04* (2013.01); *H04L 49/358* (2013.01); *H04L 67/288* (2013.01)

(58) Field of Classification Search
CPC . H04L 47/6205; H04L 67/288; H04L 49/358; H04L 69/22
See application file for complete search history.

(56) References Cited

U.S. PATENT DOCUMENTS

| 7,035,212 | B1 | 4/2006 | Mittal et al. |
| 7,142,509 | B1* | 11/2006 | Rovner ............. H04L 29/06027 370/230 |
| 2009/0064308 | A1 | 3/2009 | Komatsu |
| 2013/0003725 | A1 | 1/2013 | Hendel et al. |
| 2013/0086199 | A1 | 4/2013 | Frank et al. |

(Continued)

OTHER PUBLICATIONS

International Searching Authority, The International Search Report and the Written Opinion, dated Apr. 24, 2017, PCT/US2016/044664, 13 Pgs.

(Continued)

*Primary Examiner* — Omer S Mian
(74) *Attorney, Agent, or Firm* — Hewlett Packard Enterprise Patent Department

(57) ABSTRACT

The disclosure relates to a method, system, and medium to deliver an ingress packet to a queue at a gateway device. In an example, the gateway device can receive an ingress packet from an Ethernet. Moreover, the gateway device determines a memory queue identifier corresponding to a queue at a second gateway device for the ingress packet. Then, the gateway device delivers the ingress packet to the queue at the second gateway device without the ingress packet being processed at the plurality of server processors.

20 Claims, 5 Drawing Sheets

(56) References Cited

U.S. PATENT DOCUMENTS

| | | | |
|---|---|---|---|
| 2013/0151646 A1* | 6/2013 | Chidambaram | H04L 47/6205 |
| | | | 709/213 |
| 2014/0269271 A1 | 9/2014 | Gafni et al. | |
| 2015/0169454 A1 | 6/2015 | Jin | |
| 2015/0222533 A1 | 8/2015 | Birrittella et al. | |
| 2016/0036600 A1 | 2/2016 | Hamada et al. | |
| 2016/0072817 A1* | 3/2016 | Makhervaks | H04L 63/101 |
| | | | 726/3 |
| 2017/0201594 A1* | 7/2017 | Johnsen | H04L 12/66 |
| 2019/0363989 A1* | 11/2019 | Shalev | H04L 61/007 |

OTHER PUBLICATIONS

Extended European search report received for EP Patent Application No. 16910746.3, dated Feb. 12, 2020, 06 pages.

* cited by examiner

DELIVER AN INGRESS PACKET TO A QUEUE AT A GATEWAY DEVICE

BACKGROUND

An Ethernet gateway coupled to a memory fabric generally acts as a shared network interface card (NIC) doing network input/output on behalf of one or more servers. The servers can be virtual machines, micro-servers, etc. The ingress packets usually are delivered to the queues at the servers for processing. Likewise, the servers use the queues to deliver egress packets to the Ethernet gateways.

BRIEF DESCRIPTION OF THE DRAWINGS

The following detailed description references the drawings, wherein.

DETAILED DESCRIPTION

An Ethernet gateway connects a memory fabric to Ethernet. In some implementations, the Ethernet gateway may be a single application-specific integrated circuit (ASIC) with a memory fabric interface on one side and Ethernet interfaces on the other. The ASIC may have a modest amount of external memory. This Ethernet gateway is shared by all of the servers on a memory fabric. In some examples, every server on the Ethernet can access the Ethernet gateway, but only a subset of the servers can use the Ethernet gateway.

A memory fabric on a subnet may have multiple Ethernet gateways. Each server on the subnet runs an eNIC driver instance for each Ethernet gateway. An eNIC driver loads and runs as if it were the driver for an Ethernet network interface card (NIC), but uses the memory fabric hardware instead of a NIC, communicating either directly with other eNIC instances, with Ethernet gateways, or both. The eNIC driver shares the Ethernet gateway ASIC. The eNIC driver could run in any kind of hybrid computing environment, e.g., a hypervisor, in a virtual machine, in a container, on a hardware server, in a user space, etc. As such, the Ethernet gateway addresses a software endpoint, not a physical server.

For an egress packet, the Ethernet gate way receives the egress packet sent by a device on the memory fabric and resends the egress packet to Ethernet. The role of Ethernet gateway primarily is to prioritize packets from many sources onto a single uplink, and optionally to attach a header (e.g., a VLAN header, a VxLAN header, etc.) to each packet based on its source.

For an ingress packet, the Ethernet gateway receives the ingress packet from Ethernet and delivers the ingress packet to a queue in the memory fabric domain. The Ethernet gateway parses ingress packet headers to identify a particular memory queue on a particular device in the memory fabric to which the payload should be delivered, and then delivers the ingress packet to the particular memory queue.

As mentioned above, the memory fabric can be coupled to a plurality of Ethernet Gateways and a plurality of servers. Thus, a first Ethernet Gateway receiving an ingress packet may parse the ingress packet and determine a destination queue in a second Ethernet Gateway to which the ingress packet will be delivered. The destination queue is similar to the queues that the plurality of servers use to deliver egress packets to the plurality of Ethernet Gateways. However, the ingress packet is delivered to the second Ethernet Gateway bypassing the plurality of servers.

Overview

Figure 1:
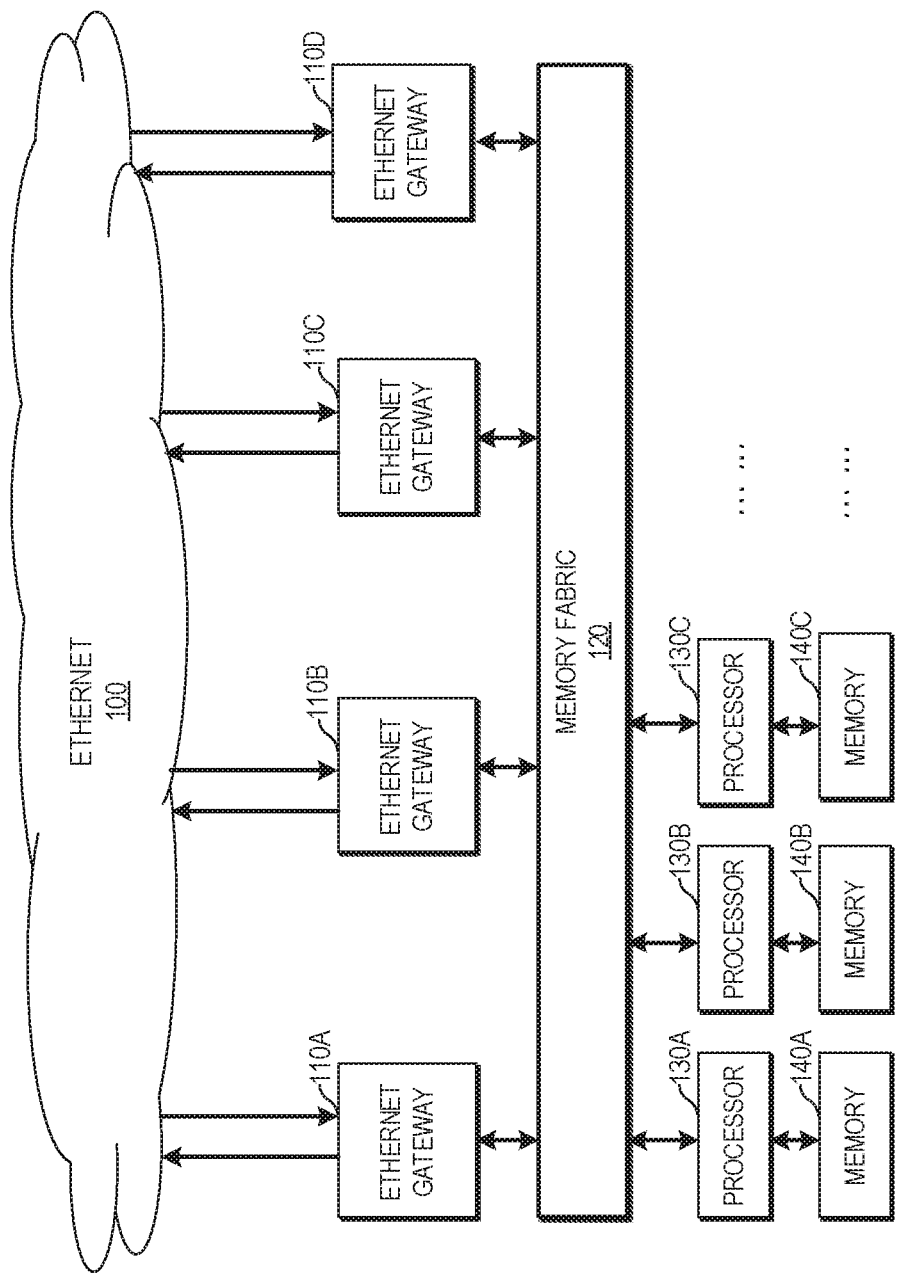
FIG. 1 is a block diagram of an example environment for delivering an ingress packet to a queue at a gateway device.

FIG. 1 is a block diagram of an example environment for delivering an ingress packet to a queue at a gateway device. FIG. 1 includes Ethernet 100, a memory fabric 120, a plurality of Ethernet gateways 110A-110D, a plurality of processors 130A-130C, a plurality of memories 140A-140C, etc. Note that although in the illustration of FIG. 1, the plurality of memories 140A-140C are coupled to memory fabric 120 through the plurality of processors 130A-130C, in some implementations, the plurality of memories 140A-140C can be coupled directly to memory fabric 120 rather than through the plurality of processors 130A-130C.

Ethernet 100 generally refers to any network that is in compliance with IEEE 802.3 standards. In some implementations, Ethernet 100 may be replaced by another computer networking interconnect, such as, InfiniBand (IB) as used in high performance computing environment between servers and/or storage systems.

Memory fabric 120 may be implemented in hardware, software, or a hybrid architecture with both hardware and software components. Memory Fabric 120 allows any device (such as a processor) on a fabric to load and store memory locations in any other device on the fabric, provided the device has been given access rights to that range of memory addresses. This allows software on a collection of processors to interact through shared data structures in the style of operating system kernel threads; allows software on a collection of processors to access shared storage-in-memory at memory latency rather than through traditional storage software stacks; and allows software on a collection of processors to communicate among themselves in the style of InfiniBand work queues, but at hardware latency. Also, memory fabric 120 simplifies layers of software in computer systems that perform operations such as booting up, monitoring, diagnosing, etc. For example, booting from an image in persistent memory can be performed via a pointer with proper access rights. As another example, logs of events and other diagnostic data can be written to a memory region directly. Hence, it is advantageous for memory fabric 120 to replace a server's storage and/or network stack with a lightweight user space library that performs remote memory read and write operations inline.

Memory fabric 120 generally conveys five types of actions, all expressed as variants or combinations of reads or writes to memory addresses: (1) Near discrete memory access, e.g., processor reads and writes of main memory within the same smartphone, PC client, or server enclosure. (2) Far memory access, e.g., processor reads and writes of main memory in a different server (or storage) enclosure, possibly in a different rack. (3) Low latency messaging between processors at servers in the same memory fabric domain, e.g., application in user space on one processor sends a short message to a cooperating application running in user space on a different processor, (4) Low latency messaging between processes tunneled over Ethernet between memory fabric domains. (5) Send and receive network traffic to/from Ethernet via a memory fabric to Ethernet gateway (e.g., Ethernet gateways 110A-110D).

Memory fabric 120 is coupled with a plurality of servers. Each server comprises at least a server processor (e.g., processors 130A-130C) and a memory (e.g., memories 140A-140C). Memories 140A-140C can be memories coupled to the plurality of servers that are only accessible via communications with the plurality of server processors 130A-130C. Alternatively, memories 140A-140C can be memories in a standalone device that are interconnected with the network.

The plurality of server processors 130A-130C could be as small as a blades chassis with a dozen servers, or as large as thousands of processor cores spread over several racks. Each server runs its own software stack, for example, the traditional Transmission Control Protocol/Internet Protocol (TCP/IP) stack, of its operating system. Moreover, each server is deployed with an eNIC driver. The eNIC driver understands that it is sharing the Ethernet gateway. The eNIC driver could run in a hypervisor, in a virtual machine, in a container, or on a bare metal server. Each of Ethernet gateways 110A-110D generally addresses a plurality of software endpoints, not a physical server. An optimized eNIC driver could be run in user space.

Applications running in the data center communicate with a wired or wireless client, or a service in another data center through Ethernet connections to routers at the data center. Connecting both Ethernet 100 and memory fabric 120 to every server processor (e.g., processors 130A-130C) would not be cost efficient. Thus, Ethernet 100 is reached from a memory fabric domain (e.g., memory fabric 290) through one or more Ethernet gateways 110A-110D. When memory fabric 120 is coupled with multiple Ethernet gateways (e.g., Ethernet gateways 110A-110D), each server on the same subnet as memory fabric 120 will run an eNIC driver instance for each Ethernet gateway.

Generally, when Ethernet gateways 110A-110D receives an ingress packet from Ethernet 100, Ethernet gateways 110A-110D can send the ingress packet for processing by one of the servers coupled to memory fabric 120, which will consume resources of both server processors 130A-130C and memories 140A-140C. In order to improve the scalability of ingress traffic processing, Ethernet gateways according to the present disclosure can also parse the ingress packet to determine whether the packet is suitable for deliver directly to an egress Ethernet gateway (110A-110D) coupled to memory fabric 120. If so, the ingress Ethernet gateway for the ingress packet will bypass the plurality of servers and deliver the ingress packet to a queue at the egress Ethernet gateway. This is particularly useful when the plurality of servers and Ethernet gateways on memory fabric 120 is used collectively as a large network router.

For example, the ingress Ethernet gateway can execute a memory write operation to deliver the ingress packet to a destination queue in memory fabric 120. In some implementations, the memory write operation only identifies the destination queue. In other implementations, the memory write operation can identify both the destination queue and a specific location in the queue where the ingress packet will be delivered. Note that, the destination queue can be either located in one of the plurality of server processors (130A-130C) or memories (140A-140C), or in one of the egress Ethernet gateways (140A-140D).

Because a large amount of ingress traffic can be redirected to an egress Ethernet gateway, the solution herein greatly improves the throughput of high performance memory fabric. Also, because the cost of a server processor processing packet traffic is much higher than the cost of a gateway device (e.g., an Ethernet switch), the solution herein is also very cost efficient. Here, the ingress Ethernet gateway could be the same as or different from the egress Ethernet gateway. Ethernet gateways are described in details in the section below.

Ethernet Gateway

Figure 2:
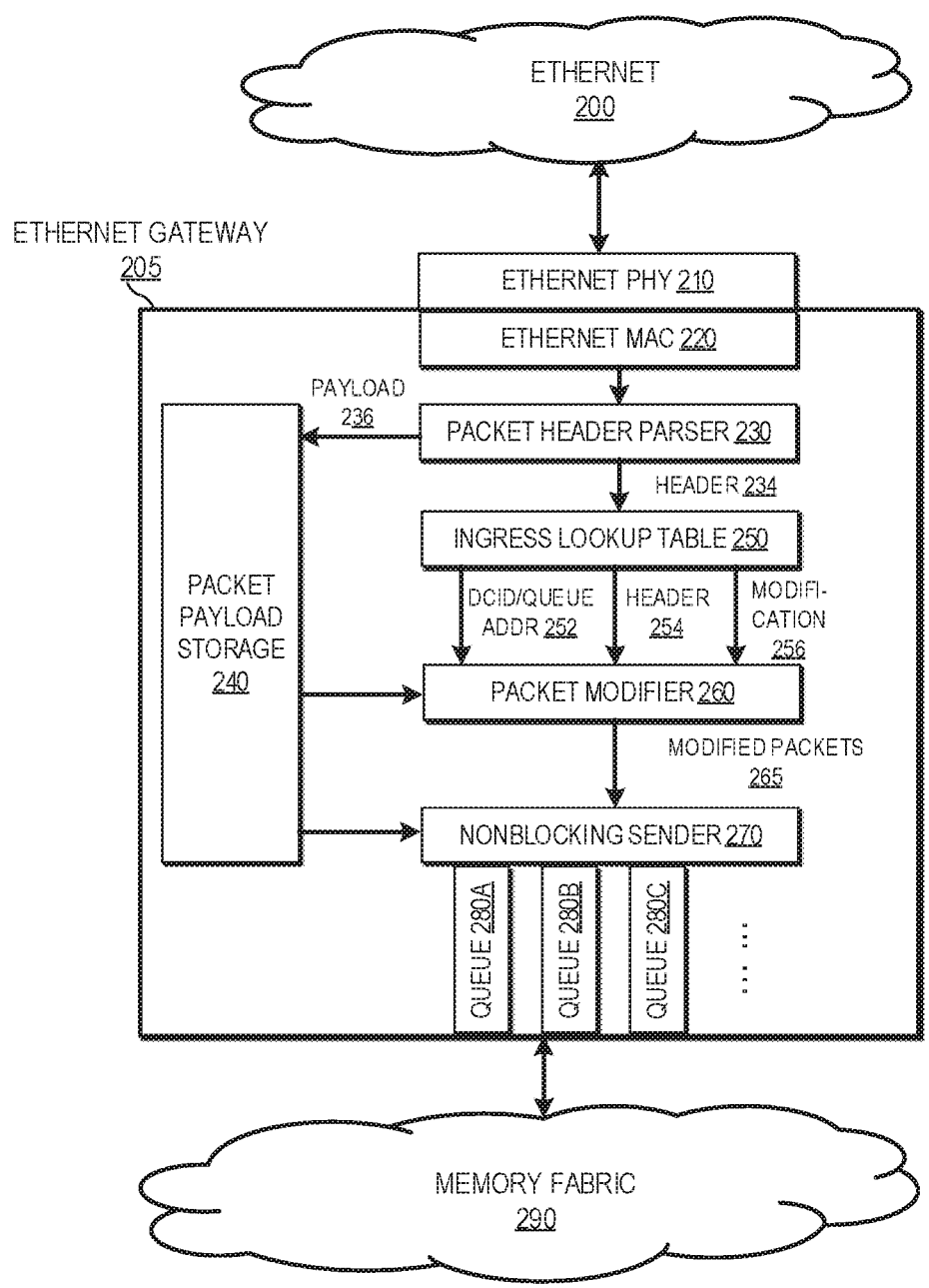
FIG. 2 is a block diagram of an example gateway device delivering ingress packets.

FIG. 2 is a block diagram of an example gateway device delivering ingress packets. FIG. 2 includes an Ethernet 200, a memory fabric comprising a plurality of memory fabric 290, and an Ethernet gateway 205. Ethernet gateway 205 further includes an Ethernet PHY interface 210, an Ethernet MAC interface 220, a packet header parser 230, an ingress lookup table 250, a packet modifier 260, a non-blocking sender 270, a packet payload storage 240, and a plurality of queues (or queue pairs) 280A-280C.

Similar to an Ethernet switch, Ethernet gateway 205 connects to an Ethernet 200 and a memory fabric 290. Ethernet gateway 205 can be either a software component, a hardware component, or a combination of both. Ethernet gateway 205 examines each ingress packet received from Ethernet 200 via Ethernet interfaces (e.g., Ethernet PHY 210 and Ethernet MAC 220) independently, then sends said ingress packet out through a corresponding egress port, e.g., via one of queues 280A-280C.

A. Deliver an Ingress Packet to Ethernet Gateway

For an ingress packet received from Ethernet 200, Ethernet gateway 205 delivers the ingress packet to a destination queue in a memory fabric domain (e.g., memory fabric 290). For some ingress packets, the destination queue is in a server within the memory fabric domain. For other ingress packets, however, the destination queue is located within an egress Ethernet gateway. Thus, the ingress Ethernet gateway 205 delivers the ingress packet directly to the destination queue in the egress Ethernet gateway bypassing the servers in the memory fabric domain (e.g., memory fabric 290).

The ingress packet passes through an interface of ingress Ethernet gateway 205, which includes an Ethernet PHY interface 210 and an Ethernet MAC interface 220. The output of the Ethernet MAC interface 220 is an entire Ethernet packet. In some implementations, payload 236 of the entire Ethernet packet is stored in a packet payload storage 240 in a central memory.

Moreover, Ethernet gateway 205 includes a packet header parser 230. When an ingress packet is received from Ethernet 200 via Ethernet PHY interface 210 and Ethernet MAC interface 220, the ingress packet is further processed by packet header parser 230. In particular, Ethernet gateway 205 extracts a certain number of bytes from a beginning portion of the ingress packet, and delivers the extracted bytes (e.g., header 234) to packet header parser 230 for further processing. Packet header parser 230 primarily parses ingress packet headers to identify a particular destination memory queue on a memory fabric device, to which the payload 236 of the ingress packet should be delivered.

Note that, unlike an Ethernet switch that parses multiple encapsulation headers to retrieve the MAC address of an ingress packet for layer-2 forwarding (or IP address and port for layer-3 forwarding), packet header parser 230 in Ethernet gateway 205 identifies and addresses a precise destination queue address to which the packet should be delivered, rather than identifying the next hop (e.g., a particular port of the Ethernet switch through which the packet should be sent).

On one hand, Ethernet gateway 205 supports multi-tenancy. Thus, network traffic corresponding to different customers of a data center will be isolated from each other.

On the other hand, Ethernet gateway 205 also supports isolation of departments within a data center tenant. Customers do not practically coordinate with each other on the usage of addresses (particularly when creating MAC addresses for virtual machines). Therefore, duplicate addresses can occur on different tenants of the same data center. Hence, according to the present disclosure, looking up an ingress packet in ingress lookup table 250 of Ethernet gateway 205 can involve looking up the combination of a tenant identifier, a department identifier, and an address, such as an SVLAN, CVLAN, and MAC address. Note that, here, the ingress packet may include multiple encapsulation headers, one encapsulation header, or no encapsulation header at all.

The network can also address an endpoint either with a MAC address in Layer 2 or with an IP address in Layer 3. Because a data center can use the IP address to forward from its switch to an individual server, Ethernet gateway 205 coupled to memory fabric 290 would likely receive traffic directed to its own MAC address. As such, Ethernet gateway 205 needs to check the IP header within an ingress packet in order to determine the ingress packet's actual destination.

Another example implementation that supports multi-tenancy and other network segmentation and isolation using IP addresses involves the use of VxLAN headers. VxLAN is often used along with a variety of Layer 3 Virtual Private Network (L3VPN) technologies in wide area networks, but it is also used to connect to network segments in the data center. In some implementations, packet header parser 230 can add or remove these VxLAN encapsulation headers. Thus, in order to determine the exact destination queue of an ingress packet, packet header parser 230 will have to parse through one or more of such outer encapsulations to reach the inner packet's headers. In some implementations, packet header parser 230 can use patterns that allow ASICs at Ethernet gateway 205 to parse more complicated and flexible header combinations.

Once the ingress packet is parsed, the destination address and the network context of that address are presented to a relatively large on-chip table, e.g., ingress lookup table 250. Ingress lookup table 250 could include a MAC address or an IP address as an input. The output of ingress lookup table 250 can be a destination component identifier (DCID) 252, a header 254, an exact queue address, a memory region access key, and any other information needed to form the memory fabric operations to deliver the ingress packet (e.g., modification 256). Here, the Ethernet gateway ingress table lookup is fully qualified. Thus, the inner VLAN field, the outer VLAN field, and the MAC address field all have to match in ingress lookup table 250. Further, Ethernet gateway 205 can be configured to match a customized network design, for example, by using one or two headers (e.g., VLAN headers or VxLAN headers) plus a network address to determine where a packet should go, and will deliver any headers inside those as payload to the destination.

Note that the output of ingress lookup table 250 includes all of the information needed to send the ingress packet over memory fabric 290 not to a generic queue, but to the exact queue on the exact device named by the destination address and port. Once the Ethernet gateway ingress table lookup is complete, the ingress packet is ready to be sent to its destination queue via memory fabric 290.

In some examples, when the ASIC of Ethernet gateway 205 has multiple ports coupled with memory fabric 290, ingress lookup table 250 would also indicate through which port the ingress packet should exit.

Also, ingress lookup table 250 may include instructions to Ethernet gateway 205's packet modifier 260 for modifying the packet. For example, the instructions to packet modifier 260 could include instructions to remove one or more outer headers of the ingress packet. Packet modifier 260 generates modified packets 265 after modifying the packet following the instructions. Packet modification by packet modifier 260 may be accomplished as a separate step, or dynamically as the ingress packet is read from buffer memory and transmitted.

To avoid head-of-line (HOL) blocking on a single path from Ethernet gate way 205 to memory fabric 290, an example ASIC of Ethernet gateway 205 may implement multiple packet disassembly resources in non-blocking sender 270. A packet, which is ready to be transmitted to memory fabric 290, occupies one of these packet disassembly resources. Each packet disassembly resource disassembles the ingress packet into a series of memory write operations. Moreover, non-blocking sender 270 waits for the acknowledgement of each memory write operation, and handles any retransmissions as needed. Having multiple packet disassembly resources allows a particular ingress packet's traffic to wait if a particular destination in memory fabric 290 issues a "receiver not ready" response. In such scenarios, other ingress packets destined to other addresses in memory fabric 290 will be allowed to proceed. Therefore, according to the present disclosure, the bandwidth of memory fabric 290 can significantly exceed the bandwidth of Ethernet 200. As a result, the receiving path can deliver ingress packets to their destination queues without any noticeable queue delay. There rarely is a need to apply flow control on any Ethernet port (e.g., Ethernet PHY 210). Dropping an ingress packet occurs even more rarely.

Note that the latency of access to memory across memory fabric 290 is low enough that local memory is used on Ethernet gateway 205 to hold an ingress packet until it can be determined where the ingress packet will be delivered. After the packet destination is determined, the ingress packet will be delivered quickly to free the ASIC resources used for holding the ingress packet.

Because switches in memory fabric 290 should not cause head-of-line (HOL) blocking, HOL blocking need to be avoided at Ethernet gateway 205. Ethernet gateway 205 will lead to HOL blocking if all of its packet disassembly resources are waiting for queues in destinations, which have issued "receiver not ready" responses. Therefore, Ethernet gateway 205 includes enough packet disassembly resources to reduce the probability of HOL blocking.

Moreover, a packet disassembly resource is configured with a suitable timeout period. If an ingress packet cannot be delivered within the timeout period, the event is counted or logged. Further, the ingress packet will be dropped upon expiration of the timeout period, and the packet disassembly resource is freed for processing other ingress packets.

B. Receive an Egress Packet at Ethernet Gateway

Although only ingress logic is depicted in the example gateway in FIG. 2, an Ethernet gateway 205 can include a similar logic to deliver egress packets. For example, an egress packet modification block may be configured and coupled to Ethernet MAC 220. Moreover, Ethernet gateway 205 will have a basic PHY layer (e.g., Ethernet PHY 210) on chip, as well as an off-chip PHY layer for greater distance connections, or to provide the forward error correction needed for long distance optical connections (LR).

If Ethernet gateway 205 supports multiple Ethernet uplinks, the memory fabric connections and reassembly sources are shared among the multiple Ethernets 200, but the remaining blocks are duplicated on a per-Ethernet basis.

In some implementations, a plurality of message queues (e.g., queues 280A-280C) can be assigned to specific uplinks manually. In other implementations, a combination of eNIC driver and Ethernet gateway can hash a given flow to a particular Ethernet, but automatically shift traffic to a companion link in the event the first link fails. Traffic are not load balanced on a per-packet across multiple Ethernet links because this would break Ethernet ordering rules.

C. Message Queues

The eNIC driver in a given host sends ingress packets to a particular queue or queues (e.g., 280A-280C) in Ethernet gateway 205. Ethernet gateway 205 could support as few as less than ten queues, or as many as thousands of queues. Queues 280A-280C generally refers to any type of message queues that support multiple senders, so that customer configurations can scale across the number of software or hardware senders on memory fabric 290.

In some implementations, a reassembly resource receives a sequence of memory write operations, which fill a single buffer with segments of a single Ethernet packet. The sequence of memory write operations ends with a last write operation that has a special bit set to indicate that the packet is the last one in the sequence. Moreover, the reassembly resource (e.g., packet modifier 260) at Ethernet gateway 205 verifies that there are no gaps between a received sequence of memory write operations. In other words, Ethernet gateway 205 verifies that there were no memory write operations lost due to, for example, CRC errors. Then, Ethernet gateway 205 delivers the packet as a single unit to its queues 280A-280C. In other implementations, Ethernet gateway 205 does not have a queue or reassembly resources dedicated to each possible endpoint.

There are two sets of metadata configured for each queue in queues 280A-280C in Ethernet gateway 205. They are "priority metadata" and "egress packet modification metadata." "Priority metadata" generally configures a scheduling engine (e.g., non-blocking sender 270), assigning traffic that arrives on this queue to a particular class of service. The scheduling engine (e.g., non-blocking sender 270) selects the next packet to send in accordance with the packet's priority, performs an appropriate round-robin or weighted-round robin scheduling scheme within a priority level, and guarantees forward progress.

"Egress packet modification metadata" generally instructs the egress block on which encapsulation header(s) to place on the front of every packet from that queue, which checksums or CRCs to calculate and insert, as well as any other header bits or changes to perform on a packet. Note that, the eNIC driver is configured with which fields the Ethernet gateway will complete in order to avoid a malformed packet being sent. Note also that making the encapsulation a property of the queue enhances Ethernet security, because it constrains a client by not giving the client direct access to a send queue on an Ethernet gateway.

An important aspect of security is ensuring that a particular eNIC driver can only perform memory write operations to their assigned queues 280A-280C within Ethernet gateway 205. For example, this can be accomplished by placing each queue address in a separate memory region. As a result, access to each queue generally can be controlled by giving permissions to different ranges of memory addresses. Specifically, for example, a separate region key may be assigned for each separate memory region. Moreover, to establish an eNIC driver's connection with Ethernet gateway 205, each eNIC driver is provided with the region key for each queue it is allowed to access. This configuration ensures that repeated accesses will fail because a region key mismatch will rapidly result in the requestor on those transactions being blocked from accessing memory fabric 290.

Generally, a sender will attempt to push packets faster than the Ethernet can send them. For a non-shared queue, Ethernet gateway 205 can advertise a queue small enough that the memory space is affordable, such that the sender would have to wait for queue space to free up. For a shared queue, a full queue triggers a wait handling scheme at memory fabric 290. For example, in some implementations, there may be a feedback scheme at Ethernet gateway 205 to handle the wait by the eNIC driver on memory fabric 290.

If Ethernet gateway has fewer packet reassembly resources than the queues or senders, and a new packet starts to arrive when all of the reassembly resources are in use, Ethernet gateway 205 will use the memory fabric 290's wait handling scheme to force the sender to retry. As a result, the eNIC driver will be forced to wait.

Since the eNIC driver and Ethernet gateway ASIC collaborates with each other, it is possible for the eNIC driver to push an address/length pair as a very short message, and a data mover in the Gateway pull packets across memory fabric 290 from a server memory. This implementation would need less on-ASIC buffer space in Ethernet gateway 205.

It is possible to create an eNIC driver that queues address/length pairs at Ethernet gateway 205. Then, Ethernet gateway 205 dereferences these pairs by pulling the buffer contents from memory over memory fabric 290. Dereferencing the address/length pairs can be done in bulks by a data mover in Ethernet gateway 205.

Processes to Deliver an Ingress Packet to a Queue at a Gateway

Figure 3:
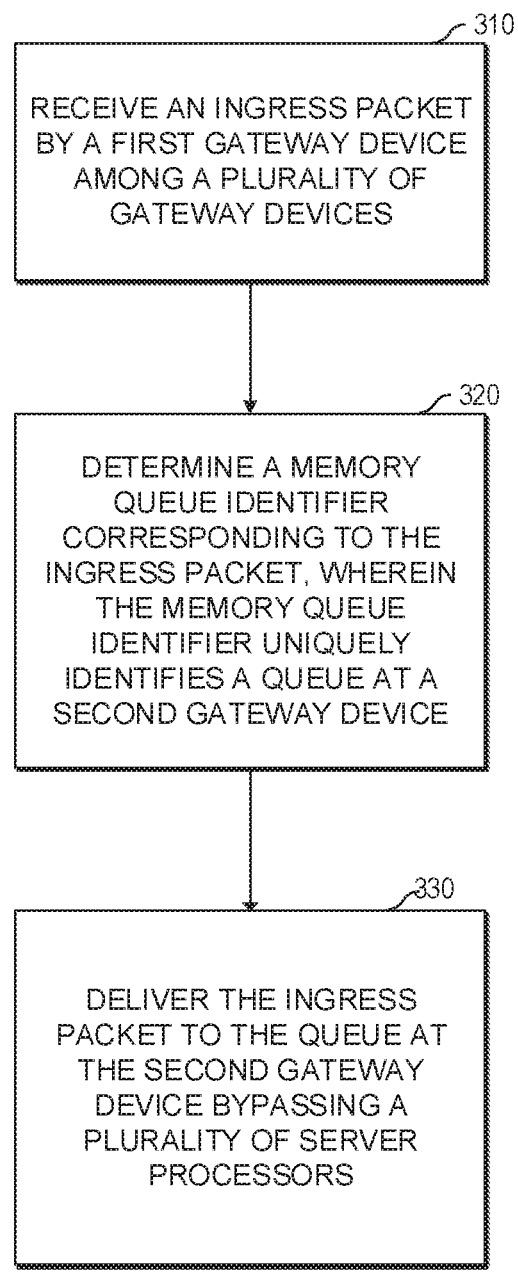
FIG. 3 is a flowchart of an example process to deliver an ingress packet to a queue at a gateway device.
Figure 4:
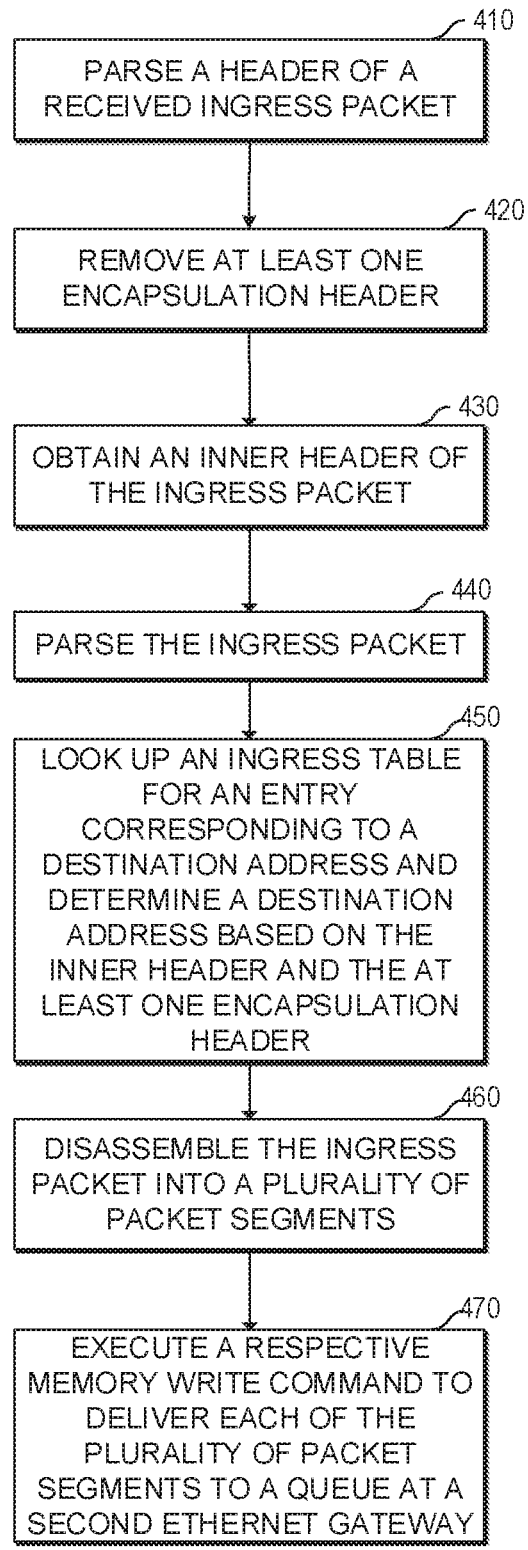
FIG. 4 is a flowchart of an example process to deliver an ingress packet to a queue at a gateway device.

In discussing FIGS. 3-4, references may be made to the components in FIGS. 1-2 to provide contextual examples. In one implementation, the Ethernet gateway 110A-D as in FIG. 1 executes operations 310-330 to deliver an ingress packet to a queue at a gateway device. In one implementation, the Ethernet gateway 110A-D as in FIG. 1 executes operations 410-470 to deliver an ingress packet to a queue at a gateway device. Further, although FIGS. 3-4 are described as implemented by a gateway device, it may be executed on other suitable components. For example, FIGS. 3-4 may be implemented in the form of executable instructions on a machine-readable storage medium 520 as in FIG. 5.

FIG. 3 is a flowchart of an example process to deliver an ingress packet to a queue at a gateway device. Initially, a first gateway device among a plurality of gateway devices receives an ingress packet (operation 310). Note that the plurality of gateway devices are coupled with a memory fabric and a plurality of server processors. Then, the first gateway device determines a memory queue identifier corresponding to the ingress packet (operation 320). Here, the memory queue identifier uniquely identifies a queue at a second gateway device in the plurality of gateway devices. Next, the first gateway device executes a memory write command to deliver the ingress packet to the queue at the second gateway device bypassing the plurality of server processors (operation 330). It is important to note that although the memory fabric comprises a plurality of server, each having at least a processor and a memory, the ingress packet are delivered through switches in the memory fabric directly to the second gateway device. The second gateway device delivers the ingress packet to the Ethernet without involving the plurality of servers in the memory fabric.

FIG. 4 is a flowchart of another example process to deliver an ingress packet to a queue at a gateway device. In this example, an Ethernet gateway parses a header of a received ingress packet (operation 410). Then, the Ethernet gateway removes at least one encapsulation header (operation 420). Moreover, the Ethernet gate way obtains an inner header of the ingress packet (operation 430). Next, the Ethernet gateway parses the ingress packet (operation 440).

Also, the Ethernet gateway looks up in an ingress table for an entry corresponding to a destination address and determines a destination address based on the inner header and the at least one encapsulation header (operation 450). Here, the destination address has a different value from a destination address header field in the ingress packet. The entry may include, but is not limited to, a destination component identifier (DCID) and the memory queue identifier.

The memory queue identifier may include, but is not limited to, a memory address; a combination of a memory fabric destination component identifier and the memory address; a memory region identifier identifying a region and an address within the region; a memory window identifier identifying a window and an address within the window; a protection domain identifier identifying a protection domain and an address within the protection domain; a target address in a Symmetric Hierarchical Memory access (SHMEM); etc.

The memory fabric destination component identifier (DCID) includes, for example, an InfiniBand Local Identifier (LID), an InfiniBand Global Identifier (GID), a high performance computing (HPC) fabric host identifier, a virtual local area network (VLAN) header, a Transparent Interconnection of Lots of Links (TRILL) header, a Service Identifier (I-SID) header, a Media Access Control (MAC) address, an Internet Protocol (IP) address; etc.

Further, the Ethernet gateway disassembles the ingress packet into a plurality of packet segments (operation 460). Finally, the Ethernet gateway executes a respective memory write command to deliver each of the plurality of packet segments to a queue at a second Ethernet gateway (operation 470).

In some implementations, the ingress packet delivered to the queue at the second gateway device is indistinguishable from packets delivered to the queue from the plurality of server processors.

Not all ingress packets are processed bypassing the plurality of servers. In some implementations, the first gateway device can receive a second ingress packet, then determine a memory queue identifier corresponding to the ingress packet, whereas the memory queue identifier uniquely identifies a queue at a server processor among the plurality of server processors. Then, the first gateway device executes a memory write command to deliver the ingress packet to the queue at the server processor. In this example, the second ingress packet will be processed by the server processor and then delivered to an egress gateway device (e.g., the second gateway device). It is important to note that, when the egress gateway device (e.g., the second gateway device) receives the delivery of such an ingress packet (e.g., the first ingress packet delivered from the first gateway device, or the second ingress packet delivered from the server processor), the egress gateway device is agnostic of where the ingress packet is delivered from. Both the first ingress packet and the second ingress packet will appear to be delivered from the memory fabric from the viewpoint of the second gateway device.

In some implementations, for a large ingress packet, the first gateway device will disassemble the ingress packet into a plurality of packet segments. Then, the first gateway device can execute a respective memory write command to deliver each of the plurality of packet segments to the queue at the second gateway device. When the second gateway device receives the plurality of packet segments, the second gateway device reassembles the plurality of packet segments into a single egress packet. Further, the second gateway device can modify the single ingress packet based on instructions associated with the queue at the second gateway device.

Network Device to Deliver an Ingress Packet to a Queue at a Gateway

Figure 5:
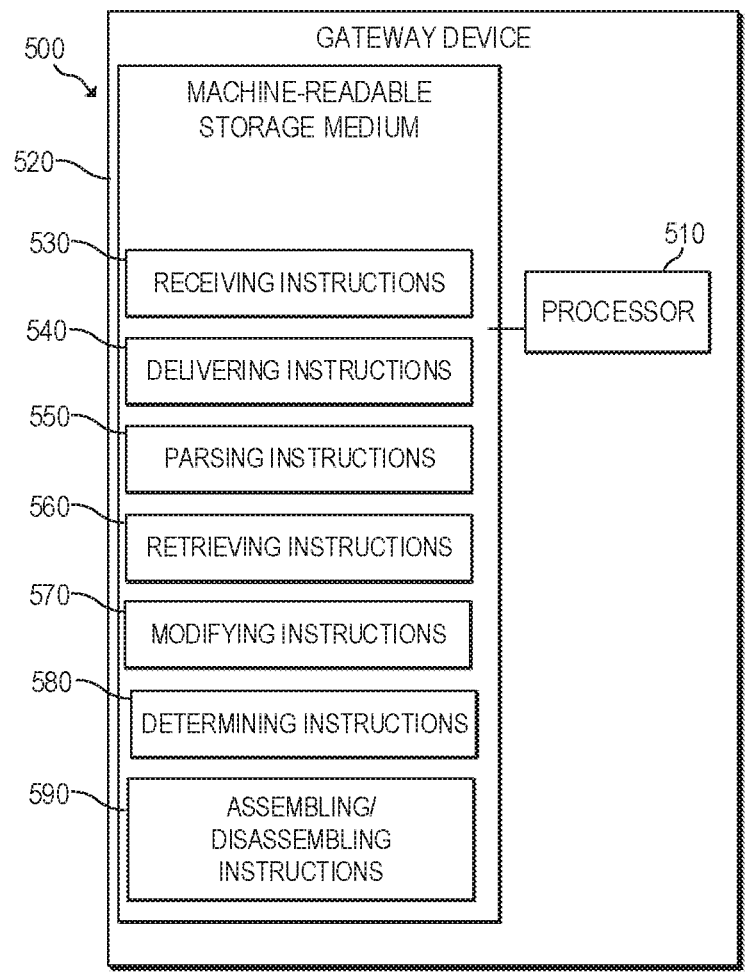
FIG. 5 is a block diagram of an example network device to deliver an ingress packet to a queue at a gateway device.

FIG. 5 is a block diagram of an example network device to deliver an ingress packet to a queue at a gateway device. The example network device 500 has at least one processor 10 to execute instructions 530-590 within a machine-readable storage medium 520 to deliver an ingress packet to a queue at a gateway. Although the network device 500 includes at least one processor 510 and machine-readable storage medium 520, it may also include other components that would be suitable to one skilled in the art. For example, network device 500 may include an additional processing component and/or storage. In another implementation, the networking component (e.g., Ethernet gateway 110A-D as in FIG. 1) executes instructions 530-590. Network device 500 is an electronic device with the at least one processor 510 capable of executing instructions 530-590, and as such implementations of network device 500 include a server, data center, networking device, computer, memory fabric device, or other type of electronic device capable of executing instructions 530-590. The instructions 530-590 may be implemented as methods, functions, operations, and other processes implemented as machine-readable instructions stored on the storage medium 520, which may be non-transitory, such as hardware storage devices (e.g., random access memory (RAM), read only memory (ROM), erasable programmable ROM, electrically erasable ROM, hard drives, and flash memory).

The at least one processor 510 may fetch, decode, and execute instructions 530-590 to deliver an ingress packet to a queue at a gateway device. Specifically, the at least one processor 510 executes instructions 530-590 to: receive an ingress packet; determine a memory queue identifier corresponding to the ingress packet; execute a memory write command to deliver the ingress packet to the queue at the second gateway device bypassing the plurality of server processors; parse a header of the ingress packet; remove at least one encapsulation header; obtain an inner header of the ingress packet; determine a destination address based on the inner header of the ingress packet and the at least one encapsulation header; look up an ingress table for an entry corresponding to the destination address; receive a second ingress packet; determine a memory queue identifier corresponding to the second ingress packet; execute a memory write command to deliver the ingress packet to the queue at a server processor; disassemble the ingress packet into a plurality of packet segments; execute a respective memory write command to deliver each of the plurality of packet segments to the queue at the second gateway device; etc.

The machine-readable storage medium 520 includes instructions 530-590 for the processor 510 to fetch, decode, and execute. In another example, the machine-readable storage medium 520 may be an electronic, magnetic, optical, memory, storage, flash-drive, or other physical device that contains or stores executable instructions. Thus, the machine-readable storage medium 1020 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 520 may include an application and/or firmware which can be utilized independently and/or in conjunction with the at least one processor 510 to fetch, decode, and/or execute instructions of the machine-readable storage medium 520. The application and/or firmware may be stored on the machine-readable storage medium 520 and/or stored on another location of the network device 500.

I claim:

1. A method comprising:
receiving a packet by a first gateway device of a plurality of gateway devices coupled with a memory fabric and a plurality of computing devices, wherein the memory fabric allows a respective computing device to load and store data based on memory locations in any other computing device of the plurality of computing devices;
determining, by the first gateway device, a memory queue identifier corresponding to the packet, wherein the memory queue identifier uniquely identifies a queue at a second gateway device; and
executing, by the first gateway device, a memory write command based on the memory queue identifier to deliver the packet to the queue at the second gateway device via the memory fabric bypassing processing at the plurality of computing devices.

2. The method of claim 1, further comprising:
parsing a header of the packet; and
determining the memory queue identifier by removing at least one encapsulation header based on the parsing.

3. The method of claim 2, further comprising:
obtaining an inner header of the packet by removing the at least one encapsulation header; and
determining a first destination address based on the inner header of the packet and the at least one encapsulation header, wherein the first destination address is distinct from a second destination address in the packet.

4. The method of claim 2, further comprising:
looking up the first destination address in an ingress table for a corresponding entry, wherein the entry comprises a destination component identifier (DCID) and the memory queue identifier.

5. The method of claim 1, wherein the packet is in a same format of packets delivered to a queue in one of the plurality of computing devices.

6. The method of claim 1, further comprising:
receiving, by the first gateway device, a second packet;
determining, by the first gateway device, a second memory queue identifier corresponding to the second packet, wherein the second memory queue identifier uniquely identifies a second queue at a computing device of the plurality of computing devices; and
executing, by the first gateway device, a second memory write command to deliver the second packet to the second queue at the computing device.

7. The method of claim 1, further comprising:
dividing the packet into a plurality of packet segments;
executing, by the first gateway device, a respective memory write command to deliver each of the plurality of packet segments to the queue at the second gateway device via the memory fabric.

8. The method of claim 6, wherein the second gateway device reassembles the plurality of packet segments into the packet.

9. The method of claim 1, wherein the memory queue identifier comprises one of:
a memory address;
a combination of a memory fabric destination component identifier (DCID) and the memory address;
a memory region identifier identifying a region and an address within the region;
a memory window identifier identifying a window and an address within the window;
a protection domain identifier identifying a protection domain and an address within the protection domain; and
a target address in a Symmetric Hierarchical Memory access (SHMEM).

10. The method of claim 9, wherein the memory fabric DCID comprises at least one of: an InfiniBand Local Identifier (LID), an InfiniBand Global Identifier (GID), a high performance computing (HPC) fabric host identifier, a virtual local area network (VLAN) header, a Transparent Interconnection of Lots of Links (TRILL) header, a Service Identifier (I-SID) header, a Media Access Control (MAC) address, and an Internet Protocol (IP) address.

11. A first gateway device, comprising a processor executing instructions to:
receive a packet at the first gateway device which is in a plurality of gateway devices coupled with a memory fabric and a plurality of computing devices, wherein the memory fabric allows a respective computing device to load and store data based on memory locations in any other computing device of the plurality of computing devices;
determine a memory queue identifier corresponding to the packet, wherein the memory queue identifier uniquely identifies a queue at a second gateway device; and
execute a memory write command based on the memory queue identifier to deliver the packet to the queue at the second gateway device via the memory fabric bypassing processing at the plurality of computing devices.

12. A non-transitory machine-readable storage medium encoded with instructions executable by at least one processor of a first gateway device among a plurality of gateway devices, the machine-readable storage medium comprising instructions to:
receive a packet at the first gateway device of a plurality of gateway devices coupled with a memory fabric and a plurality of computing devices;
determine a memory queue identifier corresponding to the packet, wherein the memory queue identifier uniquely identifies a queue at a second gateway device; and
execute, at the first gateway device, a memory write command based on the memory queue identifier to deliver the packet to the queue at the second gateway device via the memory fabric bypassing processing at the plurality of computing devices.

13. The non-transitory machine-readable storage medium of claim 12, further comprising instructions to:
divide the packet into a plurality of packet segments; and
execute, by the first gateway device, a respective memory write command to deliver each of the plurality of packet segments to the queue at the second gateway device via the memory fabric.

14. The first gateway device of claim 11, wherein the processor executes instructions further to:
parse a header of the packet; and determine the memory queue identifier by removing at least one encapsulation header based on the parsing.

15. The first gateway device of claim 14, wherein the processor executes instructions further to:
look up the first destination address in an ingress table for a corresponding entry, wherein the entry comprises a destination component identifier (DCID) and the memory queue identifier.

16. The first gateway device of claim 11, wherein the processor executes instructions further to:
receive a second packet;
determine a second memory queue identifier corresponding to the second packet, wherein the second memory queue identifier uniquely identifies a second queue at a computing device of the plurality of computing devices; and
execute a second memory write command to deliver the second packet to the second queue at the computing device.

17. The first gateway device of claim 11, wherein the processor executes instructions further to:
divide the packet into a plurality of packet segments; and
execute a respective memory write command to deliver each of the plurality of packet segments to the queue at the second gateway device via the memory fabric.

18. The non-transitory machine-readable storage medium of claim 12, further comprising instructions to:
parse a header of the packet; and
determine the memory queue identifier by removing at least one encapsulation header based on the parsing.

19. The non-transitory machine-readable storage medium of claim 18, further comprising instructions to:
look up the first destination address in an ingress table for a corresponding entry, wherein the entry comprises a destination component identifier (DCID) and the memory queue identifier.

20. The non-transitory machine-readable storage medium of claim 12, further comprising instructions to:
receive a second packet;
determine a second memory queue identifier corresponding to the second packet, wherein the second memory queue identifier uniquely identifies a second queue at a computing device of the plurality of computing devices; and
execute a second memory write command to deliver the second packet to the second queue at the computing device.

* * * * *